US010075973B2

(12) United States Patent
Lei

(10) Patent No.: US 10,075,973 B2
(45) Date of Patent: Sep. 11, 2018

(54) SCHEDULING ASSIGNMENT TRANSMISSION TIMING FOR USER EQUIPMENT ENABLING DEVICE-TO-DEVICE COMMUNICATION

(71) Applicant: Microsoft Technology Licensing, LLC, Redmond, WA (US)

(72) Inventor: Haipeng Lei, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 248 days.

(21) Appl. No.: 14/503,301

(22) Filed: Sep. 30, 2014

(65) Prior Publication Data

US 2016/0037512 A1     Feb. 4, 2016

(30) Foreign Application Priority Data

Jul. 31, 2014   (CN) .......................... 2014 1 0370903

(51) Int. Cl.
*H04W 72/12*     (2009.01)
*H04W 72/04*     (2009.01)
(Continued)

(52) U.S. Cl.
CPC .......... *H04W 72/1289* (2013.01); *H04L 1/00* (2013.01); *H04L 1/1854* (2013.01);
(Continued)

(58) Field of Classification Search
CPC .... H04L 1/1822; H04L 1/1896; H04W 92/18; H04W 72/12; H04W 72/0413;
(Continued)

(56) References Cited

U.S. PATENT DOCUMENTS

2009/0196204 A1*  8/2009  Astely ................... H04L 1/1635
                                                                370/280
2013/0223353 A1   8/2013  Liu et al.
(Continued)

OTHER PUBLICATIONS

"International Preliminary Report on Patentability Issued in PCT Application No. PCT/US2015/042767", dated Jul. 15, 2016, 7 Pages.
(Continued)

*Primary Examiner* — Redentor Pasia
*Assistant Examiner* — Peter Mak
(74) *Attorney, Agent, or Firm* — Ray Quinney & Nebeker, P.C.; Thomas M. Hardman; Miia Sula

(57) ABSTRACT

This disclosure generally relates to scheduling assignment transmission timing by a base station for a D2D UE. In one embodiment, a base station may determine timing information for transmission of SA associated with a D2D Tx UE and then transmit the timing information to the UE. A D2D-grant signaling may also be transmitted from the base station to the UE. Responsive to receiving the D2D-grant signaling from the base station, the D2D Tx UE may firstly transmit the SA to other UE(s) according to the indicated timing information. In one embodiment, the timing information may be included in the D2D-grant signaling. In this way, timing of the SA transmission is determined by the base station and informed to the UE, and since the base station controls the SA transmission timings of in-coverage UEs, an appropriate timing of the SA transmission may be selected for the UE so as to guarantee UEs transmitting SAs have opportunities to receive the SA transmissions of other UEs.

18 Claims, 3 Drawing Sheets

(51) Int. Cl.
H04W 76/14 (2018.01)
H04W 56/00 (2009.01)
H04W 92/18 (2009.01)
H04L 1/00 (2006.01)
H04W 76/02 (2009.01)
H04L 1/18 (2006.01)

(52) U.S. Cl.
CPC ......... *H04W 56/003* (2013.01); *H04W 72/04* (2013.01); *H04W 76/023* (2013.01); *H04W 76/14* (2018.02); *H04W 92/18* (2013.01)

(58) Field of Classification Search
CPC ........... H04W 72/0406; H04W 72/042; H04W 72/1289; H04W 76/023
See application file for complete search history.

(56) References Cited

U.S. PATENT DOCUMENTS

| | | | |
|---|---|---|---|
| 2013/0322413 A1* | 12/2013 | Pelletier | H04W 72/1289 370/336 |
| 2014/0086152 A1 | 3/2014 | Bontu et al. | |
| 2014/0086158 A1 | 3/2014 | Tavildar et al. | |
| 2014/0112194 A1 | 4/2014 | Novlan et al. | |
| 2014/0148177 A1 | 5/2014 | Ratasuk et al. | |
| 2014/0177540 A1 | 6/2014 | Novak et al. | |
| 2015/0271807 A1* | 9/2015 | Patil | H04W 76/14 455/426.1 |
| 2015/0271846 A1* | 9/2015 | Kowalski | H04W 72/14 370/329 |
| 2016/0183276 A1* | 6/2016 | Marinier | H04W 72/02 370/329 |
| 2017/0135075 A1* | 5/2017 | Jiang | H04W 72/042 |

OTHER PUBLICATIONS

Lee, et al., "Timing Synchronization Method for Device-to-Device Communication System", In Proceedings of the 7th International Conference on Ubiquitous Information Management and Communication, Jan. 17, 2013, 6 pages.

Lee, et al., "A Fine Timing Synchronization Method on Group Communication System Enablers for LTE", In 19th Asia-Pacific Conference on Communications, Aug. 29, 2013, pp. 21-25.

"International Search Report and Written Opinion Issued in PCT Application No. PCT/US2015/042767", dated Nov. 20, 2015, 11 Pages.

Ericsson, "Overview of D2D Scheduling", °°http://www.3gpp.org/ftp/tsg_ran/WG2_RL2/TSGR2_85/docs/R2-140626.zip<<, Feb. 10, 2014, 5 Pages.

Ericsson, "D2D Scheduling Procedure", °°http://www.3gpp.org/ftp/tsg_ran/WG2_RL2/TSGR2_84/docs/R2-134238.zip<<, Nov. 11, 2013, 7 Pages.

* cited by examiner

SCHEDULING ASSIGNMENT TRANSMISSION TIMING FOR USER EQUIPMENT ENABLING DEVICE-TO-DEVICE COMMUNICATION

RELATED APPLICATIONS

This application claims priority to Chinese Application No. 201410370903.9, filed on Jul. 31, 2014, and entitled "SCHEDULING ASSIGNMENT TRANSMISSION TIMING FOR USER EQUIPMENT ENABLING DEVICE-TO-DEVICE COMMUNICATION." This application claims the benefit of the above-identified application, and the disclosure of the above-identified application is hereby incorporated by reference in its entirety as if set forth herein in full.

BACKGROUND

Major effort has been put in recent years on the development of Third Generation Partnership Project (3GPP) Long Term Evolution (LTE) in order to achieve higher data rates and system capacity. In 3GPP LTE-Advanced (LTE-A) cellular systems, device-to-device (D2D) communication has been proposed to enable the proximity-based service. The D2D communication allows user equipment (UEs) to communicate with each other through a direct connection, operating in uplink (UL) spectrum in the case of Frequency Division Duplex (FDD) or UL subframes in the case of Time Division Duplex (TDD). In general, there are two modes for D2D communication resource allocation, Mode 1 and Mode 2. In Mode 1, a base station schedules exact resource for D2D UEs within its cell coverage to transmit control information and D2D data. In Mode 2, a D2D UE autonomously selects resource for D2D communication from a resource pool.

For D2D communication Mode 1, a D2D-grant signaling is transmitted by the base station in a downlink signaling channel to a D2D Transmit (Tx) UE for the purpose of indicating resource for D2D data communication and related control information. In particular, the control information, which can be also referred as scheduling assignment (SA), is used to indicate resource for reception of the associated D2D broadcasting data to the corresponding D2D Receive (Rx) UE(s). Additional necessary control information is also included in the SA, e.g., Modulation and Coding Scheme (MCS) for D2D data transmission, timing advance (TA), etc. The Tx UE may transmit the SA and associated broadcasting data to the Rx UE(s) after receiving the D2D-grant signaling, using the resource that is indicated in the D2D-grant signaling.

SUMMARY

Due to the half-duplex constraint of D2D communication, a D2D Tx UE cannot receive broadcasting data from other D2D Tx UE(s) if it is transmitting data simultaneously. Likewise, for the SA transmission, UE cannot receive the broadcast SA from other UE(s) if it is transmitting its SA at the same time, which may lead to SA reception missing. Additionally, if D2D Tx UE receives D2D-grant signaling from a base station, the UE usually needs to send a corresponding ACK/NACK feedback to a base station, so that the base station can know whether the D2D-grant signaling has been successfully received and avoid uplink resource waste because if the D2D-grant signaling is missed by the UE, the base station can assign the uplink resource allocated for this UE to other UEs instead of preserving it.

In view of the foregoing, timing of the SA transmission needs to be appropriately selected, so as to avoid a conflict with SA transmissions from other UEs as well as with transmission of the ACK/NACK feedback corresponding to the D2D-grant signaling.

In accordance with embodiments of the subject matter described herein, a base station may determine timing information for SA transmission for a D2D Tx UE and then transmit the timing information to the UE. A D2D-grant signaling may be transmitted from the base station to the UE. Responsive to receiving the D2D-grant signaling from the base station, the D2D Tx UE may transmit the SA to other UE(s) according to the indicated timing information. In one embodiment, the timing information may be included in the D2D-grant signaling. In this way, timing of the SA transmission can be controlled by the base station and informed to the UE. Since the base station controls the SA transmission timings of in-coverage UEs, an appropriate timing of the SA transmission may be selected for the UE so as to guarantee UEs transmitting SAs have opportunities to receive the SA transmissions of other UEs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT). Moreover, as described above, D2D UE refers to UE enabling the D2D communications.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one further embodiment." Other definitions, explicit and implicit, may be included below.

Figure 1:
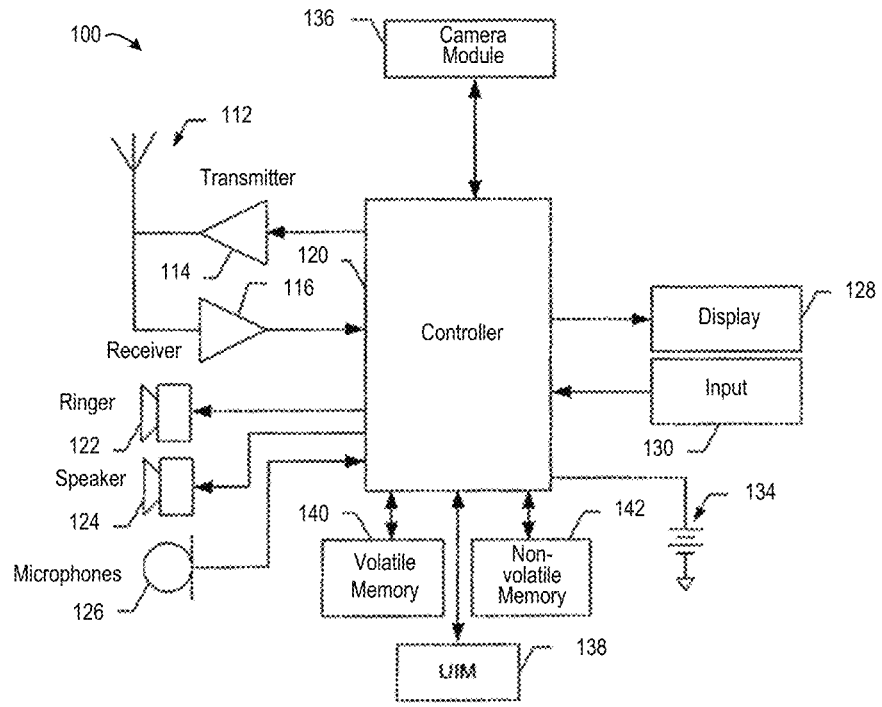
FIG. 1 illustrates a block diagram of user equipment in accordance with one embodiment of the subject matter described herein.

FIG. 1 illustrates a block diagram of UE 100 in accordance with one embodiment of the subject matter described herein. The UE 100 may be a mobile device with a wireless communication capability. However, it is to be understood that any other types of user devices may also easily adopt embodiments of the subject matter described herein, such as a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein.

As shown, the UE 100 comprises one or more antennas 112 operable to communicate with the transmitter 114 and the receiver 116. With these devices, the UE 100 may perform cellular communications with one or more BSs. Additionally, the UE 100 may be a D2D UE that supports the D2D communications with one or more other UEs.

The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

The UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The UE 100 further comprises a memory. For example, the UE 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the UE 100 so as to implement the functions of the UE 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Figure 2:
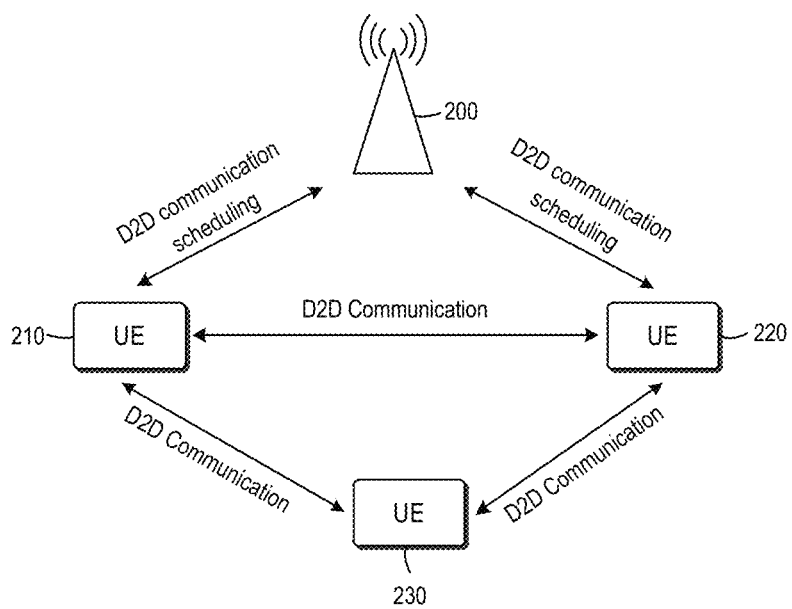
FIG. 2 illustrates a block diagram of an environment in which embodiments of the subject matter described herein may be implemented.

FIG. 2 shows an environment in which embodiments of the subject matter described herein may be implemented. As shown, one or more UEs may communicate with a BS 200, requesting for D2D communication resource. In this example, there are three UEs 210, 220, and 230, and the UEs 210, 220 may communicate with the BS 200. This is only for the purpose of illustration without suggesting limitations on the number of UEs. There may be any suitable number of UEs in communication with the BS 200. In one embodiment, the UEs 210, 220, and/or 230 may be implemented by the UE 100 as shown in FIG. 1, for example.

Two or more UEs may perform D2D communications with one another. In the example shown in FIG. 2, only for the purpose of illustration, the UEs 210 and 220 may work as D2D Tx UEs, and the UE 230 may work as a D2D Rx UE. The BS 200 may be responsible for scheduling the D2D communication between the UEs 210, 220 and 230. For example, in one embodiment, if the Tx UE 210 or 220 intends to establish a D2D connection with the Rx UE 230, the Tx UE 210 or 220 may send a D2D scheduling request to the BS 200. Responding to the request, the BS 200 may determine and transmit to the Tx UE 210 or 220 a D2D-grant singling for allocating resource for D2D SA and data transmission. The SA is used to indicate resource allocated for the D2D data transmission, MCS for the D2D data transmission, TA, or the like. In a further embodiment, the Tx UE 210 or 220 may feed back an ACK/NACK corresponding to the D2D-grant signaling to the BS 200. With the resource indicated by the D2D-grant signaling, D2D communication may be conducted from the Tx UEs 210 and 220 to the Rx UE 230. At this point, the Rx UE 230 may receive the SA for D2D data transmission from the Tx UE 210 or 220 on the uplink spectrum or uplink subframes allocated by the BS 200. Since the ACK/NACK feedback and the SA may be both sent after receiving the D2D-grant signaling by the Tx UE 210 or 220, the timing of transmission of the SA is required to be different from the timing of the ACK/NACK feedback due to the half-duplex constraint.

Also, if the UE 230 broadcast its SA at the same time with the UE 210 or 220 broadcasting their SA, the UE 230 may not be able to receive the SA from the UE 210 or 220, and the SA from the UE 230 may not be received by the UE 210 or 220 as well. In view of the foregoing, the timing of SA transmission in UE is needed to be appropriately selected so as to avoid a conflict with its ACK/NACK feedback transmission or with SA transmissions of other UEs.

Figure 3:
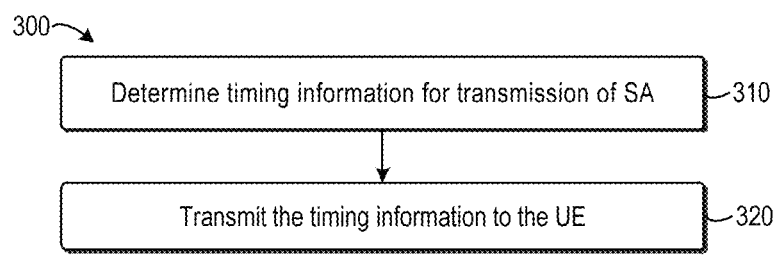
FIG. 3 illustrates a flowchart of a method in a base station for controlling SA transmission timing for a D2D UE in accordance with one embodiment of the subject matter described herein.

FIG. 3 shows the flowchart of a method 300 for controlling SA transmission timing for a D2D UE in accordance with one embodiment of the subject matter described herein. The method 300 may be at least in part implemented by the BS 200, for example.

The method 300 is entered at step 310, where timing information for transmission of SA associated with UE is determined. The SA may indicate control information for D2D data transmission, for example, resource allocated for the D2D data transmission, MCS for the D2D data transmission, TA, or the like. In one embodiment, the BS 200 may determine the timing information after receiving a request for D2D communication resource from the UE, for example, the UE 210 or 220 shown in FIG. 2.

In accordance with embodiments of the subject matter described herein, the BS 200 determines an appropriate timing for SA transmission of this UE at step 310, trying to avoid a conflict with the ACK/NACK feedback corresponding to the D2D-grant signaling in the UE. In one embodiment, the BS 200 may determine a timing indicator (referred to as "the first timing indicator") that indicates a time interval (referred to as "the first time interval") from receiving the D2D-grant signaling to an initial transmission of the SA by the UE. The first time interval may be different to a time interval from receiving the D2D-grant signaling to transmission of the ACK/NACK feedback corresponding to the D2D-grant signaling by the UE.

In a LTE/LTE-A system, both FDD and TDD have their defined strict downlink (DL) Hybrid Automatic Repeat Request (HARQ) timing. For example, in a FDD system, upon receiving Physical Downlink Shared Channel (PDSCH) or Physical Downlink Control Channel (PDCCH) indicating DL Semi-Persistent Scheduling (SPS) release in DL subframe n, UE may report the corresponding ACK/NACK in UL subframe n+4, where a subframe lasts 1 ms. The 4 ms delay to report the ACK/NACK reserves time margin for UE processing. Usually, 4 ms is regarded as the minimum requirement for UE HARQ-ACK transmission. In D2D communication Mode 1, a similar timing problem exists. If the D2D-grant signaling is received from a base station, a corresponding ACK/NACK feedback may be transmitted to the base station by the UE. As the ACK/NACK feedback corresponding to the D2D-grant signaling can inform the base station whether the D2D-grant signaling has been successfully received and can avoid uplink resource waste, the ACK/NACK feedback may have priority over the SA transmission and then may be firstly transmitted by the UE in the (n+4)th subframe after receiving the D2D-grant signaling in the nth subframe. In that sense, UE cannot transmit SA in UL subframe n+4. In one embodiment, the BS 200 may determine the first time interval as being greater than 4 ms for SA transmission, retaining enough time for UE processing and preserving the 4 ms delay for the ACK/NACK feedback. For example, the first time interval may be in a range of 6-12 ms.

It should be noted that the time interval of 4 ms is an example time margin of UE processing, any other time interval may be selected. According to the UE performance, the time margin may be different. In these cases, the first time interval may be determined as being larger than the specific time margin and different from the timing of ACK/NACK feedback.

The first timing indicator used to indicate the first time interval may be represented by one or more bits. In some embodiments, the first timing indicator may exactly indicate the value of the first time interval. For example, a four-bit indicator may be used to indicate a time interval from 1 to 16 ms with the granularity of 1 ms. In order to reduce a transmission overhead of the timing indicator, several time intervals may be predefined and numbered in other embodiments. Then it is possible to use fewer bits to indicate the number of predetermined time interval. For example, assuming four time intervals, 6 ms, 8 ms, 10 ms, and 12 ms, are predefined, a 2-bit indicator is required to indicate one of these time intervals to the UE.

Due to the half-duplex constraint of D2D communication, a D2D Tx UE cannot receive broadcasting data from other D2D Tx UE(s) if multiple D2D Tx UEs are multiplexed in a FDM manner within a given resource pool configured for D2D communication. This violates the general concept of broadcasting where all UEs in a given resource set may be able to receive the broadcast data, especially in the case that UEs are in the same public safety group, e.g. a firemen group, a policemen group, etc. Likewise, for the SA transmission, UE cannot receive the broadcast SA from other UE(s) if it is transmitting its SA at the same time. Therefore, within a same SA cycle, a SA transmission timing determined by the BS may guarantee UEs transmitting SAs have opportunities to receive the SA transmissions of other UEs. In one embodiment, the BS 200 may determine the timing for the SA initial transmission as being different than timing determined previously or concurrently for a SA initial transmission or retransmission associated with at least one further UE in its coverage. For example, if the BS 200 previously determined for the UE 210 a timing indicator indicating the UE 210 to transmit its SA at subframe 5, when determining timing information for the UE 220, the BS 200 may be aware of the subframe 5 not being available and then determine a different SA transmission timing for the UE 220. In this event, a conflict with other SA transmissions may be avoided.

Multiple transmissions of a same SA may enhance the reliability of SA transmission and obtain time domain randomization gain. In some embodiments, when determining the timing information at step 310, the BS 200 may further determine a timing indicator (referred to as "the second timing indicator") that indicates the number of transmission times for a same SA. The number of transmission times may be, for example, in a range of 1 to 8.

The second timing indicator may be represented by one or more bits. In some embodiments, the second timing indicator may exactly indicate the number of the SA transmission. For example, a three-bit indicator may be used to indicate the number of times from 1 to 8. In order to reduce a transmission overhead of the timing indicator, several values may be predefined and numbered in other embodiments. Then it is possible to use fewer bits to indicate the predetermined values. For example, assuming four values of times for SA transmission, 1, 2, 4, and 8, are predefined, a 2-bit indicator is required to indicate one of these values to the UE. For another example, if only two values of times for SA transmission are predefined, e.g., 1, 2 or 1, 4, then only one bit is required to indicate one of the two values to the UE.

In case multiple transmissions of a same SA are supported, another timing indicator (referred to as "the three timing indicator") may be determined by the BS 200 to indicate a time interval (referred to as "the second time interval") between two consecutive transmissions of the same SA in accordance with further embodiments. The second time interval may be or may not be equal to the first time interval. In some embodiments, multiple second time intervals may be determined for different every two consecutive transmissions. For example, a time interval may be determined for the first retransmission of the SA, and another different time interval may be determined for the second retransmission of the SA.

Likewise, the third timing indicator may be represented by one or more bits. In some embodiments, the third timing indicator may exactly indicate the value of the second time interval. For example, a four-bit indicator may be used to indicate a time interval from 1 to 16 ms with the granularity of 1 ms. In order to reduce a transmission overhead of the timing indicator, several time intervals may be predefined and numbered in other embodiments. Then it is possible to use fewer bits to indicate the number of predetermined time interval. For example, assuming four time interval, 6 ms, 8 ms, 10 ms, and 12 ms, are predefined, a 2-bit indicator is required to indicate one of these time intervals to the UE. In some cases, in order to save the overhead of the D2D-grant signaling, there may be no indication of the retransmission timing. In this sense, the UE may retransmit the SA using the first time interval as default SA retransmission timing.

When determining the retransmission timing for the SA at step 310, a conflict with SA transmissions of other UEs should also be avoided. In some embodiments, timing for the retransmission of the SA based on the third timing indicator may be different from timing determined previously or concurrently for a SA initial transmission or retransmission associated with at least one further user equipment in coverage of the base station. For example, if the BS 200 determined previously for the UE 220 a timing indicator indicating the UE 220 to transmit its SA at subframe 8 of a first frame, when determining retransmission timing for the UE 210, the BS 200 may be aware of the subframe 8 of the first frame being not available and then determine a different timing of SA retransmission. For example, subframe 0 of a next frame may be determined for SA retransmission of the UE 210. In this event, a conflict with other SA transmissions may be avoided.

Usually in uplink resource, a cycle with a predefined length may be assigned for SA transmission and another cycle may be assigned for D2D data transmission. Since the transmission resource in the SA cycle are limited, if a large amount of UEs all request for D2D-grant and may probably transmit their SA in a same cycle, the BS 200 may not be able to assign a different timing for each UE. In this event, it is allowed to assign the same timing for some UEs to initially transmit their SAs and make those UEs retransmit their SAs in different timings, or verse vice. Within the same SA cycle, the timing information selected by the BS 200 for all in-coverage UEs that transmit SAs (for example, the UEs 210 and 220) may guarantee those UEs have opportunities to receive the SA transmissions from other UEs, either an initial SA transmission or a retransmission. As a result, the conflicts among SA transmissions of multiple UEs in the same cell served by the base station 200 may be reduced.

It is to be understood that all or some of the first, second, and third timing indicators as described above may be included in the timing information. The subject matter described herein may not be limited in this regard.

Still with reference to FIG. 3, the method 300 then proceeds to step 320, where the BS 200 transmits the timing information to the UE.

In one embodiment, the timing information may be included in the D2D-grant signaling transmitted to the UE. For example, if the first timing indicator exactly indicates the value of the first time interval, e.g., a value in a range from 1 to 16 ms with the granularity of 1 ms, the first timing indicator may be directly sent to the UE. The same goes for the second and third timing indicators of the timing information. In other embodiments, the timing information may be separately transmitted with the D2D-grant signaling. In this embodiment, the timing information may be transmitted to the UE before the D2D-grant signaling. As such, the UE may be aware of the timing of SA transmission before it starts to transmit the SA.

In case where the value of the first, second and/or third timing indicator of the timing information is selected from several candidates, the BS 200 may firstly provide the predefined values to the UE. In one embodiment, the timing information may be included in a higher layer signaling transmitted to the UE, where the timing information indicates all candidate values for the first, second and/or third indicator. The higher layer signaling may be a radio resource control (RRC) signaling or system information block (SIB) signaling, for example. As a result, few bits may be used to indicate one of the predefined values to the UE when transmitting the timing information later, for example, in the D2D-grant signaling.

It is to be understood that the method 300 may be perform by the BS 200 to determine and transmit timing information for SA transmission for all served in-coverage UEs who request for D2D broadcasting, for example, the UEs 210 and 220.

Figure 4:
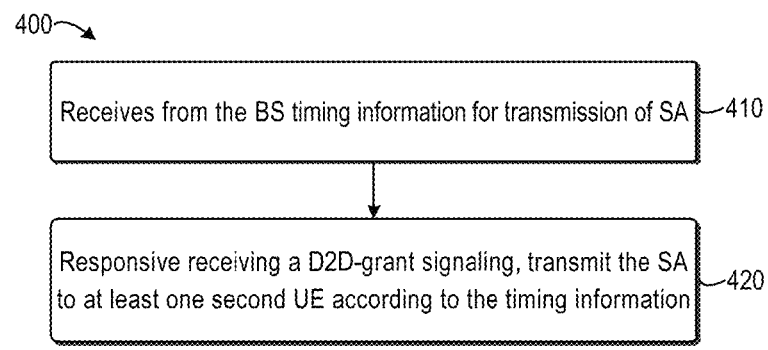
FIG. 4 illustrates a flowchart of a method in a D2D UE for transmitting SA according to timing information from a base station in accordance with one embodiment of the subject matter described herein.

FIG. 4 shows the flowchart of a method 400 for transmitting SA according to timing information from a base station in accordance with one embodiment of the subject matter described herein. The method 400 may be at least in part implemented by UE (for example, the UE 210) enabling D2D communication, for example.

The method 400 is entered at step 410, where the UE 210 receives from the BS 200 timing information for transmission of SA associated with it. The SA, as mentioned above, may at least indicate control information for D2D data transmission, which may indicate resource allocated for the D2D data transmission, MCS for the D2D data transmission, TA, or the like.

In one embodiment, as described above, the timing information may be separately transmitted to the UE 210. In another embodiment, the timing information may be included in the D2D-grant signaling and then transmitted to the UE 210. In further embodiments, the timing information may be included in a high layer signaling transmitted from the BS 200 so as to provide the candidate timing values to the UE 210.

With the timing information, the UE 210 may be informed of when to transmit its SA. The method 400 proceeds to step 420, where responsive to receiving a D2D-grant signaling from the BS 200, the UE 210 transmits the SA to at least one second UE according to the timing information. The at least one second UE may be the UEs 220 and 230, for example. The resource used for SA transmission may also be indicated in the D2D-grant signaling by the BS 220 in an embodiment.

As described above, the ACK/NACK corresponding to the D2D-grant signaling has priority above the SA transmission. In this event, before transmitting the SA to other UE(s), the UE 210 may firstly transmit the ACK/NACK to BS 200 according to a predefined HARQ timing, which may be 4 ms delay from the reception of the D2D-grant signaling.

In one embodiment, the timing information may include the first timing indicator that indicates the first time interval from receiving the D2D-grant signaling to an initial transmission of the SA, and the first time interval may be different from a time interval from receiving the D2D-grant signaling to transmission of the ACK/NACK. With such timing information, the UE 210 may transmit the SA after the first time interval starting from reception of the D2D-grant signaling. Furthermore, in order to provide enough time for UE processing and preserve the 4 ms delay for the ACK/NACK feedback, in one embodiment, the first time interval may be greater than 4 ms. In the example shown in FIG. 5, the D2D-grant signaling including the first timing indicator is received by the UE 210 from the BS 200 in subframe 0 of a first frame, where a frame contains 10 subframes, numbered from 0 to 9. Assuming the first time interval indicated by the BS 200 is 6 ms, which is greater than 4 ms, the UE 210 then may transmit the ACK feedback to the BS 200 in subframe 4 of the first frame, and broadcast the SA to the UEs 220 and 230 in subframe 6 of the first frame. The SA transmission based on the first time interval may avoid a conflict with the ACK/NACK feedback corresponding to the D2D-grant signaling.

Figure 5:
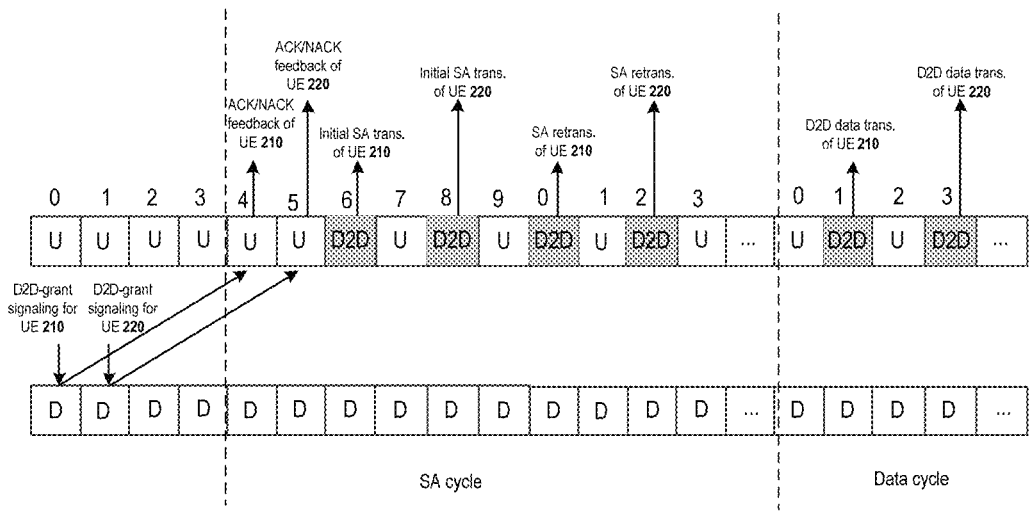
FIG. 5 illustrates a schematic diagram of SA transmission of D2D UEs in coverage of a same base station in accordance with one embodiment of the subject matter described herein.

In another embodiment, as described above, timing for the initial transmission of the SA based on the first timing indicator may be different from timing determined previously or concurrently for a SA initial transmission or retransmission associated with at least one further UE in coverage of the base station. For example, if the UE 210 determines to transmit its SA in subframe 6 of the first frame as shown in FIG. 5, based on the timing information from the BS 200, then the timing for a SA initial transmission of the UE 220 may not be selected in the subframe 6, but may be determined in, for example, subframe 8 of the same frame. All of the timings may be determined at the BS side, as discussed above.

Since multiple transmissions of a same SA may enhance the reliability of SA transmission and obtain time domain randomization gain, in some embodiments, the timing information may further include the second timing indicator that indicates the number of times for the transmission of a same SA. When receiving this timing information, the UE 210 may transmit the SA according to the number of transmission times indicated by the second timing indicator. For example, if the second timing indicator indicates to the UE 210 that the SA should be transmitted for three times, the UE 210 may retransmit its SA twice besides the initial transmission. In case where no indication of the retransmission timing is received, the UE 210 may retransmit the SA using the first time interval. In other embodiments, the timing information may further include the third timing indicator that indicates the second time interval for retransmission of the SA. With the third timing indicator, the UE 210 may retransmit the SA at the second time interval. Also take FIG. 5 as an example, when the timing information received by the UE 210 also indicates the number of SA transmission is two and the time interval of retransmission is 4 ms, after the initial SA transmission in subframe 6 of the first frame, the UE 210 may retransmit its SA after 4 ms, i.e., in subframe 0 of a next frame.

In order to avoid a conflict with SA transmissions of other UEs, as discussed above, timing for the retransmission of the SA based on the third timing indicator may be different from timing determined previously or concurrently for a SA initial transmission or retransmission associated with at least one further user equipment in coverage of the base station. For example, as shown in FIG. 5, the UE 210 may retransmit its SA in subframe 0 in a second frame based on the third timing indicator determined by the BS 200, whereas the UE 220 may have its initial SA transmission in subframe 8 of the first frame and have its SA retransmission in subframe 2 of the second frame. In the SA cycle in FIG. 5, the initial transmission and retransmission of SA associated with the UEs 210 and 220 have no conflict.

It is to be noted that after SA transmission at step 420, the UE 210 may perform additional acts. For example, the UE 210 may additionally transmit D2D data to Rx UE(s) (for example, the UEs 220 and 230) using resource indicated in the SA in a data cycle after the SA cycle as shown in FIG. 5. For the Rx UE(s), as the SA has been received already and it indicates resource for D2D data transmission, those UEs may be aware of on which resource to detect D2D data transmitted by the UE 210.

It is to be understood that the method 400 may be perform by any D2D Tx UE (for example, the UE 210 or 220) that is assigned with timing information for SA transmission by the BS 200.

Figure 6:
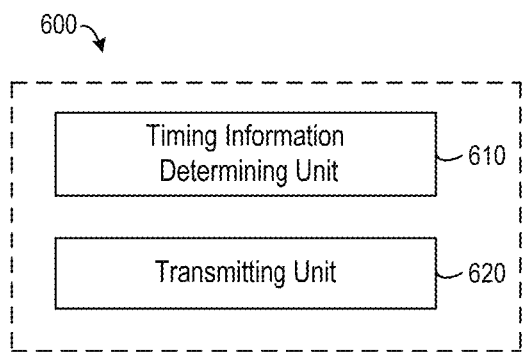
FIG. 6 illustrates a block diagram of an apparatus for controlling SA transmission timing for a D2D UE in accordance with one embodiment of the subject matter described herein.

FIG. 6 shows a block diagram of an apparatus 600 for controlling SA transmission timing for a D2D UE in accordance with one embodiment of the subject matter described herein. The apparatus 600 may be a base station or may be embodied in the base station.

As shown, the apparatus 600 comprises a timing information determining unit 610 configured to determine timing information for transmission of SA associated with user equipment, the SA indicating control information for D2D data transmission. The apparatus 600 also comprises a transmitting unit 620 configured to transmit the timing information to the user equipment.

In one embodiment, the transmitting unit 620 may be further configured to transmit a D2D-grant signaling to the user equipment, the D2D-grant signaling indicating resource for SA transmission and for the D2D data transmission. In this embodiment, the timing information may be included in the D2D-grant signaling. In another embodiment, the timing information may be included in a high layer signaling transmitted to the user equipment.

In one embodiment, the timing information determining unit 610 may be configured to determine a first timing indicator that indicates a first time interval from receiving the D2D-grant signaling to an initial transmission of the SA, the first time interval being different to a time interval from receiving the D2D-grant signaling to transmission of an ACK/NACK corresponding to the D2D-grant signaling. In another embodiment, the first time interval may be greater than 4 ms.

In one embodiment, the timing information determining unit 610 may be configured to determine a second timing indicator that indicates the number of transmission times of the SA. In another embodiment, the timing information determining unit 610 may be configured to determine a third timing indicator that indicates a second time interval for between two consecutive transmissions of the SA.

In a further embodiment, timing based on the first timing indicator or timing based on the third timing indicator is different from timing determined for at least one further user equipment.

It is to be understood that the timing information determining unit 610 may be implemented as a controller in the BS, and the transmitting unit 620 may be implemented as a transmitter in the BS.

Figure 7:
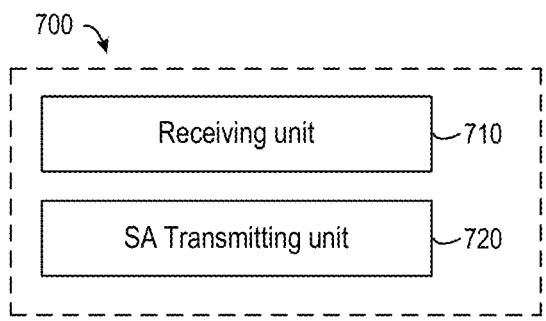
FIG. 7 illustrates a block diagram of an apparatus for transmitting SA according to timing information from a base station in accordance with one embodiment of the subject matter described herein.

FIG. 7 shows a block diagram of an apparatus 700 for transmitting SA according to timing information from a base station in accordance with embodiments of the subject matter described herein. The apparatus 700 may be UE or may be embodied in the UE.

As shown, the apparatus 700 comprises a receiving unit 710 configured to receive from a BS timing information for transmission of SA associated with the user equipment, the SA indicating control information for D2D data transmission. The apparatus 700 also comprises a SA transmitting unit 720 configured to transmit the SA to at least one second user equipment according to the timing information, responsive to receiving a D2D-grant signaling from the base station.

In one embodiment, the timing information may be included in the D2D-grant signaling or a high layer signaling transmitted from the base station.

In one embodiment, the apparatus 700 may further comprises a feedback transmitting unit configured to transmit an ACK/NACK corresponding to the D2D-grant signaling to the base station according to a predefined HARQ timing. The timing information may include a first timing indicator that indicates a first time interval from receiving the D2D-grant signaling to an initial transmission of the SA, the first time interval being different to a time interval from receiving the D2D-grant signaling to transmission of the ACK/NACK. In this embodiment, the SA transmitting unit 720 may be configured to transmit the SA after the first time interval starting from reception of the D2D-grant signaling. In another embodiment, the first time interval may be greater than 4 ms.

In one embodiment, the timing information may further include a second timing indicator that indicates the number of transmission times of the SA. In this embodiment, the SA transmitting unit 720 may be further configured to transmit the SA according to the number of transmission times indicated by the second timing indicator.

In one embodiment, the timing information may further include a third timing indicator that indicates a second time interval between two consecutive transmissions of the SA. In this embodiment, the SA transmitting unit 720 may be further configured to transmit the SA at the second time interval.

In a further embodiment, timing based on the first timing indicator or timing based on the third timing indicator may be different from timing determined for at least one further user equipment.

The units included in the apparatuses 600 and/or 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and/or 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method implemented at least in part by a base station communicating with a plurality of user equipment comprising:
    determining timing information for transmission of a plurality of scheduling assignments, each of the scheduling assignments associated with one of the plurality of user equipment and indicating control information for a device-to-device data transmission between the plurality of user equipment, wherein the timing information includes an indication of a first time for a first user equipment of the plurality of user equipment to transmit a first scheduling assignment of the plurality of scheduling assignments received from the base station to at least one third user equipment of the plurality of user equipment, and an indication of a second time for a second user equipment of the plurality of user equipment to transmit a second scheduling assignment of the plurality of scheduling assignments received from the base station to at least one fourth user equipment of the plurality of user equipment, and wherein the first time and second time are determined so that the first and second scheduling assignments are transmitted from the first and second user equipment, respectively, in different subframes within a scheduling assignment cycle;
    transmitting first device-to-device grant signaling comprising the indication of the first time to the first user equipment, the indication of the first time comprising a first time interval from receipt of the first device-to-device grant signaling at the first user equipment to an initial transmission of the first scheduling assignment, the first time interval being different from a second time interval from the receipt of the first device-to-device grant signaling at the first user equipment to transmission of an ACK/NACK corresponding to the first device-to-device grant signaling; and
    transmitting second device-to-device grant signaling comprising the indication of the second time to the second user equipment.

2. The method of claim 1,
    wherein the first and second device-to-device grant signaling indicate a resource for the first and second scheduling assignment transmission, wherein the timing information is included in the first and second device-to-device grant signaling or in a high layer signaling transmitted to the first and second user equipment, respectively.

3. The method of claim 1, wherein the first time interval is greater than 4 ms.

4. The method of claim 1, wherein determining the timing information further comprises:
    determining a retransmission indicator that indicates a number of transmission times of the first scheduling assignment.

5. The method of claim 4, wherein determining the timing information further comprises:
    determining an interval indicator that indicates a time interval between two consecutive transmissions of the first scheduling assignment.

6. The method of claim 1 wherein the at least one third user equipment includes the second user equipment, and the at least one fourth user equipment includes the first user equipment.

7. A method implemented at least in part by a first user equipment comprising:
    receiving, from a base station, timing information for transmission of a first scheduling assignments associated with the first user equipment and received from the base station, the first scheduling assignment indicating control information for a device-to-device data transmission between the first user equipment and a second user equipment, wherein the timing information includes an indication of a first time for the first user equipment to transmit the first scheduling assignment to the second user equipment, the indication of the first time comprising a first time interval from receipt of a first device-to-device grant signaling at the first user equipment to an initial transmission of the first scheduling assignment, the first time interval being different from a second time interval from the receipt of the first device-to-device grant signaling at the first user equipment to transmission of an ACK/NACK corresponding to the first device-to-device grant signaling, wherein the first time is different than a second time sent by the base station to a third user equipment for the third user equipment to transmit a second scheduling assignment to a fourth user equipment for device-to-device data transmission between the third user equipment and the fourth user equipment; and
    responsive to receiving a device-to-device grant signaling from the base station, transmitting the first scheduling assignment to the second user equipment according to the timing information, and wherein the first scheduling assignment is transmitted from the first user equipment in a different subframe within a scheduling assignment cycle than a subframe in which the second scheduling assignment is transmitted from the third user equipment.

8. The method of claim 7, wherein the timing information is included in the device-to-device grant signaling or a high layer signaling transmitted from the base station.

9. The method of claim 7, further comprising:
    transmitting the ACK/NACK corresponding to the device-to-device grant signaling to the base station according to a predefined Hybrid Automatic Repeat Request (HARQ) timing,
    wherein transmitting the first scheduling assignment comprises transmitting the first scheduling assignment after the first time interval starting from reception of the device-to-device grant signaling.

10. The method of claim 9, wherein the first time interval is greater than 4 ms.

11. The method of claim 7, wherein the timing information further includes a retransmission indicator that indicates a number of transmission times of the first scheduling assignment, and
    wherein transmitting the first scheduling assignment comprises transmitting the first scheduling assignment according to the number of transmission times indicated by the retransmission indicator.

12. The method of claim 7, wherein the timing information further includes an interval indicator that indicates a first time interval between two consecutive transmissions of the first scheduling assignment, and
    wherein transmitting the first scheduling assignment comprises retransmitting the first scheduling assignment at the time interval.

13. The method of claim 7 wherein the third and second user equipment comprise the same user equipment and the first and fourth user equipment comprise the same user equipment.

14. A base station comprising:
a transmitter; and
a controller and memory, the memory comprising program code, wherein the program code when executed, causes the controller to control the base station to:
   determine timing information for transmission of a plurality of scheduling assignments, each associated with one of a plurality of user equipment, and each of the scheduling assignments indicating control information for a device-to-device data transmission between the plurality of user equipment, wherein the timing information includes an indication of a first time for a first user equipment of the plurality of user equipment to transmit a first scheduling assignment of the plurality of scheduling assignments received from the base station to at least one third user equipment of the plurality of user equipment, and an indication of a second time for a second user equipment of the plurality of user equipment to transmit a second scheduling assignment of the plurality of scheduling assignments received from the base station to at least one fourth user equipment of the plurality of user equipment, and wherein the first time and second time are determined so that the first and second scheduling assignments are transmit from the first and second user equipment, respectively, in different subframes within a scheduling assignment cycle;
   utilize the transmitter to transmit first device-to-device grant signaling comprising the indication of the first time to the first user equipment, the indication of the first time comprising a first time interval from receipt of the first device-to-device grant signaling at the first user equipment to an initial transmission of the first scheduling assignment, the first time interval being different from a second time interval from the receipt of the first device-to-device grant signaling at the first user equipment to transmission of an ACK/NACK corresponding to the first device-to-device grant signaling; and
   utilize the transmitter to transmit second device-to-device grant signaling comprising the indication of the second time to the second user equipment.

15. The base station of claim 14, wherein the first and second device-to-device grant signaling indicate a resource for the first and second scheduling assignment transmission and for the device-to-device data transmission, and wherein the timing information is included in the first and second device-to-device grant signaling or in a high layer signaling transmitted to the first and second user equipment, respectively.

16. The base station of claim 14, wherein the first time interval is greater than 4 ms.

17. The base station of claim 14, wherein the controller is configured to determine a retransmission indicator that indicates a number of transmission times of the first scheduling assignment, and wherein the controller is configured to determine an interval indicator that indicates a time interval between two consecutive transmissions of the first scheduling assignment.

18. The base station of claim 14, wherein:
the at least one third user equipment includes the second user equipment, and the at least one fourth user equipment includes the first user equipment.

* * * * *